United States Patent
Jakupca et al.

(10) Patent No.: US 9,963,572 B2
(45) Date of Patent: May 8, 2018

(54) CHLORINATED ESTER POLYVINYL-CHLORIDE SECONDARY PLASTICIZER AND RELATED METHODS

(71) Applicant: Dover Chemical Corporation, Dover, OH (US)

(72) Inventors: Michael Jakupca, Canton, OH (US); Don Stevenson, Dover, OH (US); Jacob Weingart, Canton, OH (US); John Regula, Baltic, OH (US)

(73) Assignee: Dover Chemical Corporation, Dover, OH (US)

( * ) Notice: Subject to any disclaimer, the term of this patent is extended or adjusted under 35 U.S.C. 154(b) by 41 days.

(21) Appl. No.: 15/055,064

(22) Filed: Feb. 26, 2016

(65) Prior Publication Data
US 2016/0369086 A1    Dec. 22, 2016

Related U.S. Application Data

(60) Provisional application No. 62/180,662, filed on Jun. 17, 2015.

(51) Int. Cl.
*C08L 27/06* (2006.01)
*C08K 5/101* (2006.01)
(Continued)

(52) U.S. Cl.
CPC ............... *C08K 5/101* (2013.01); *C08K 5/09* (2013.01); *C08K 5/10* (2013.01); *C08L 57/08* (2013.01)

(58) Field of Classification Search
CPC .......... C08L 27/06; C08K 5/101; C08K 5/103
(Continued)

(56) References Cited

U.S. PATENT DOCUMENTS

| | | | | |
|---|---|---|---|---|
| 2,332,849 | A * | 10/1943 | Gruber | C08K 5/101 106/170.27 |
| 2,731,431 | A | 1/1956 | Robitschek et al. | |
| 2,969,339 | A * | 1/1961 | Krause | C08K 5/103 524/297 |

FOREIGN PATENT DOCUMENTS

| | | |
|---|---|---|
| CN | 103 740 006 A | 4/2014 |
| JP | 2000 086843 A | 3/2000 |

(Continued)

OTHER PUBLICATIONS

Murata et al., Journal of Japan Oil Chemists' Society, vol. 11 (1962), No. 7, pp. 340-344.*

(Continued)

*Primary Examiner* — Vu A Nguyen
(74) *Attorney, Agent, or Firm* — Black, McCuskey, Souers & Arbaugh, LPA

(57) ABSTRACT

A composition having polyvinylchloride; and a chlorinated ester having the chemical structure:

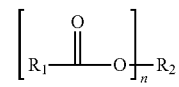

wherein $R_1$ is a $C_{6-22}$ chlorinated-hydrocarbon moiety,
wherein $R_2$ is a $C_1$-$C_{18}$ hydrocarbon moiety,
wherein n is 1, 2, 3, or 4,
wherein if n is greater than 1, each $R_1$ is the same or different; and
wherein the chlorinated ester is 15-70% by weight chlorine;
wherein the chlorinated ester is a product of a process that uses fatty-acid-ester reactants having less than two C=C double bonds; and (Continued)

wherein the chlorinated ester is a product of a process that does not use fatty-acid-ester reactants having two or more C=C double bonds.

36 Claims, 3 Drawing Sheets

(51) Int. Cl.
    *C08K 5/103*    (2006.01)
    *C08K 5/09*     (2006.01)
    *C08K 5/10*     (2006.01)
    *C08L 57/08*    (2006.01)

(58) Field of Classification Search
    USPC .................................................. 524/319, 567
    See application file for complete search history.

(56) References Cited

FOREIGN PATENT DOCUMENTS

| JP | 2014 172355 A | 9/2014 |
|----|---------------|--------|
| WO | 2015/005476 A1 | 1/2015 |

OTHER PUBLICATIONS

Univar Safety Data Sheet of CA0400 Fatty Acid.*
English Translation of Murata et al., Journal of Japan Oil Chemists' Society, vol. 11, 1962, No. 7, pp. 340-344.*
International Search Report for corresponding pending PCT application (PCT/US2016-037394).

* cited by examiner

CHLORINATED ESTER POLYVINYL-CHLORIDE SECONDARY PLASTICIZER AND RELATED METHODS

CROSS-REFERENCE TO RELATED APPLICATIONS

This U.S. non-provisional patent application claims priority to U.S. provisional patent-application Ser. No. U.S. 62/180,662 filed on Jun. 17, 2015. All of the subject matter disclosed in U.S. provisional patent application Ser. No. 62/180,662 is hereby incorporated by reference.

BACKGROUND OF THE INVENTION

Plasticizers are additives that increase the plasticity or fluidity of a material for ease of processing. In embodiments, a plasticizer is used in combination with polyvinyl-chloride (PVC) polymer. Plasticizers can be categorized into two types—primary and secondary. Primary plasticizers have sufficient affinity for the material, allowing them to disperse readily throughout the material, and can be blended in amounts ranging from 1 to upwards around 75 percent by weight in PVC dependent upon the application with minimal to no migration from the end product. Secondary plasticizers have insufficient affinity for a material to be the sole plasticizer, thus secondary plasticizers must be blended with a primary plasticizer in any amount as long as migration of the secondary plasticizer out of the polymer leading to its exudation on the surface of the finished product is minimal to non-existent. Oftentimes, a secondary plasticizer will impart some type of benefit whether it be modification of the properties of the material or an added cost benefit in reducing the amount of a much more expensive primary plasticizer being used.

Known polyvinyl-chloride (PVC) secondary plasticizers include chlorinated paraffins, epoxidized esters, and many other non-phthalate based chemistries. However, these chemistries have distinct advantages and disadvantages, thus the exploration and development of additional PVC secondary plasticizers is still needed.

BRIEF SUMMARY OF THE INVENTION

A composition having polyvinylchloride; and
a chlorinated ester having the chemical structure:

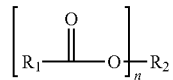

wherein $R_1$ is a $C_{6-22}$ chlorinated-hydrocarbon moiety,
wherein $R_2$ is a $C_1$-$C_{18}$ hydrocarbon moiety,
wherein n is 1, 2, 3, or 4,
wherein if n is greater than 1, each $R_1$ is the same or different; and
wherein the chlorinated ester is 15-70% by weight chlorine;
wherein the chlorinated ester is a product of a process that uses fatty-acid-ester reactants having less than two C=C double bonds; and
wherein the chlorinated ester is a product of a process that does not use fatty-acid-ester reactants having two or more C=C double bonds.

A composition having polyvinylchloride; and
a chlorinated ester having the chemical structure:

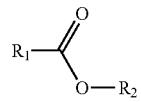

wherein $R_1$ is a $C_{12-18}$ chlorinated-hydrocarbon moiety;
wherein $R_2$ is a $CH_3$ hydrocarbon moiety;
wherein the chlorinated ester is greater than or equal to 15% by weight chlorine;
wherein the chlorinated ester is a product of a process that uses fatty-acid-ester reactants having less than two C=C double bonds; and
wherein the chlorinated ester is a product of a process that does not use fatty-acid-ester reactants having two or more C=C double bonds; and
the composition is 1-50% by weight chlorinated ester.

BRIEF DESCRIPTION OF THE SEVERAL VIEWS OF THE DRAWING(S)

DETAILED DESCRIPTION OF THE INVENTION

Figure 1:
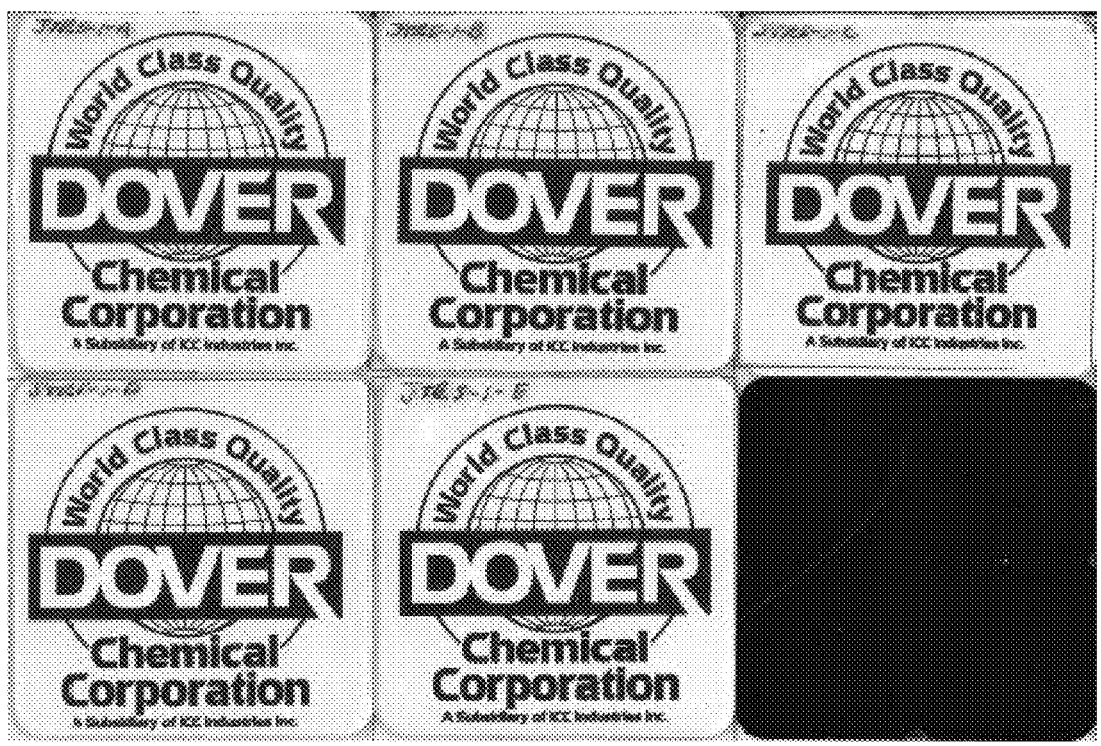
FIG. 1 shows pressed plaques for formulations A-F in Table 2.

Chlorinated esters can act as secondary plasticizers for polymeric materials. Embodiments are directed to a composition having both PVC and a chlorinated ester that is a PVC secondary plasticizer. More specifically, embodiments are directed to using chlorinated esters as PVC secondary plasticizers where the chlorinated esters are manufactured using fatty-acid-ester reactants having less than two C=C double bonds; and not manufactured using any fatty-acid-ester reactants having two or more C=C double bonds. Stated differently, embodiments are directed only to using chlorinated esters manufactured with fatty-acid-ester reactants having less than two C=C double bonds and also manufactured in the absence of fatty-acid-ester reactants having two or more C=C double bonds.

Chlorinated esters manufactured using fatty-acid-ester reactants having less than two C=C double bonds (and not manufactured using fatty-acid-ester reactants having two or more C=C double bonds) have better thermal stability relative to chlorinated esters manufactured using fatty-acid-ester reactants having two or more C=C double bonds. A non-limiting specific example of a fatty-acid ester having two or more C=C double bonds includes linoleic acid, and using linoleic acid in the manufacture of a chlorinated ester yields a chlorinated ester with poor thermal stability relative to a chlorinated ester manufactured using fatty-acid-ester reactants having less than two C=C double bonds (and not manufactured using fatty-acid-ester reactants having two or more C=C double bonds).

Those of ordinary skill in the art will be able to determine useful amounts of primary and secondary plasticizers without having to exercise undue experimentation.

In embodiments, useful chlorinated esters have the general chemical structure:

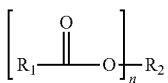

wherein $R_1$ is a chlorinated-hydrocarbon moiety;
wherein $R_2$ is a hydrocarbon moiety;
wherein n is 1, 2, 3, or 4; and
wherein if n is greater than 1, each $R_1$ is the same or different.

In addition to the above general chemical structure, the chlorinated-ester embodiments should be understood as being products that result from a manufacturing process that uses fatty-acid-ester reactants having less than two C=C double bonds (and not manufactured using fatty-acid-ester reactants having two or more C=C double bonds).

In additional embodiments, useful chlorinated-ester embodiments should be understood as having the chemical structure:

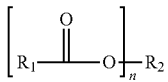

wherein $R_1$ is a $C_{6-22}$ chlorinated-hydrocarbon moiety,
wherein $R_2$ is $C_1$-$C_{18}$ hydrocarbon moiety,
wherein n is 1, 2, 3, or 4,
wherein if n is greater than 1, each $R_1$ is the same or different; and
wherein the chlorinated ester is 15-70% by weight chlorine;
wherein the chlorinated ester is a product of a process that uses fatty-acid-ester reactants having less than two C=C double bonds; and
wherein the chlorinated ester is a product of a process that does not use fatty-acid-ester reactants having two or more C=C double bonds.

For clarity, when n is 1, the structure is:

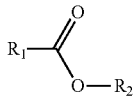

For clarity, when n is 2, the structure is:

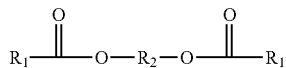

For clarity, when n is 3, the structure is:

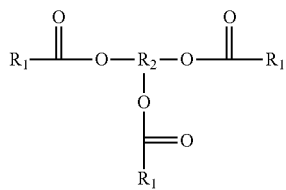

For clarity, when n is 4, the structure is:

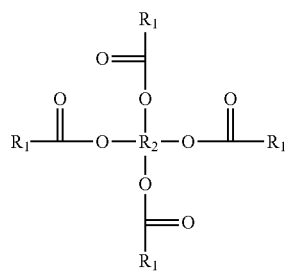

With respect to the above general chemical structure, useful chlorinated esters may be understood to have any of the following chlorinated $R_1$ moieties in combination with any of the following hydrocarbon $R_2$ moieties. Non-limiting examples of useful chlorinated $R_1$ moieties include:
1. $R_1$ is $C_{6-18}$;
2. $R_1$ is $C_{16}$, $C_{17}$, or $C_{18}$;
3. $R_1$ is $C_{10-20}$;
4. $R_1$ is $C_{10-22}$;
5. $R_1$ is $C_{12-18}$;
6. $R_1$ is $C_{10}$; $C_{12}$; $C_{14}$; $C_{16}$; or $C_{18}$;
7. $R_1$ is $C_{10}$; $C_{12}$; $C_{14}$; $C_{16}$; $C_{18}$; or $C_{20}$;
8. $R_1$ is $C_{6-22}$; and
9. $R_1$ is $C_{8-22}$.

In embodiments, the chlorinated $R_1$ moieties are chlorinated hydrocarbon moieties.

The hydrocarbon $R_2$ moiety embodiments include:
1. $R_2$ is $C_1$, $C_2$, or $C_3$;
2. $R_2$ is $C_1$-$C_3$;
3. $R_2$ is $CH_3$;
4. $R_2$ is $C_1$-$C_{18}$;
5. $R_2$ is $C_1$-$C_{20}$; and
6. $R_2$ is $C_1$-$C_{22}$.

In any of the above useful chlorinated-ester embodiments, the chlorinated ester may have any of the following amounts of chlorine:
1. the chlorinated ester is 15-70% by weight chlorine;
2. the chlorinated ester is 15-60% by weight chlorine;
3. the chlorinated ester is 15-50% by weight chlorine;
4. the chlorinated ester is 15-40% by weight chlorine;
5. the chlorinated ester is 20-40% by weight chlorine;
6. the chlorinated ester is 20-45% by weight chlorine;
7. the chlorinated ester is 20-50% by weight chlorine;
8. the chlorinated ester is 20-55% by weight chlorine;
9. the chlorinated ester is 25-40% by weight chlorine;
10. the chlorinated ester is 25-45% by weight chlorine;
11. the chlorinated ester is 25-50% by weight chlorine;
12. the chlorinated ester is 25-55% by weight chlorine;
13. the chlorinated ester is 25-70% by weight chlorine;
14. greater than or equal to 25% by weight chlorine; or
15. greater than or equal to 15% by weight chlorine.

In an embodiment, the chlorinated ester has no C=C double bonds.

In an embodiment, useful chlorinated esters have the structure:

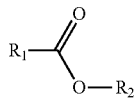

wherein R₁ is a C₆₋₂₂ chlorinated-hydrocarbon moiety; and wherein R₂ is a C₁-C₁₈ hydrocarbon moiety;

wherein the chlorinated ester is 25-70% by weight chlorine;

wherein the chlorinated ester is a product of a process that uses fatty-acid-ester reactants having less than two C=C double bonds; and wherein the chlorinated ester is a product of a process that does not use fatty-acid-ester reactants having two or more C=C double bonds.

In another embodiment, useful chlorinated esters have the structure:

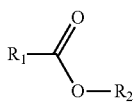

wherein R₁ is a C₆₋₂₂ chlorinated-hydrocarbon moiety; and wherein R₂ is a C₁-C₁₈ hydrocarbon moiety;

wherein the chlorinated ester is 15-60% by weight chlorine;

wherein the chlorinated ester is a product of a process that uses fatty-acid-ester reactants having less than two C=C double bonds; and wherein the chlorinated ester is a product of a process that does not use fatty-acid-ester reactants having two or more C=C double bonds.

In still another embodiment, useful chlorinated esters have the structure:

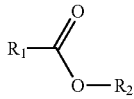

wherein R₁ is a C₆₋₂₂ chlorinated-hydrocarbon moiety; and wherein R₂ is a C₁-C₁₈ hydrocarbon moiety;

wherein the chlorinated ester is greater than 25% by weight chlorine;

wherein the chlorinated ester is a product of a process that uses fatty-acid-ester reactants having less than two C=C double bonds; and wherein the chlorinated ester is a product of a process that does not use fatty-acid-ester reactants having two or more C=C double bonds.

In still another embodiment, useful chlorinated esters have the structure:

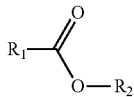

wherein R₁ is a C₆₋₂₂ chlorinated-hydrocarbon moiety; and wherein R₂ is a C₁-C₁₈ hydrocarbon moiety;

wherein the chlorinated ester is greater than 35% by weight chlorine;

wherein the chlorinated ester is a product of a process that uses fatty-acid-ester reactants having less than two C=C double bonds; and wherein the chlorinated ester is a product of a process that does not use fatty-acid-ester reactants having two or more C=C double bonds.

As previously mentioned, embodiments are directed to a composition having both PVC and a chlorinated ester. In at least some of these embodiments, the chlorinated ester acts as a PVC secondary plasticizer. Persons of ordinary skill in the art will be able to determine useful amounts of the chlorinated ester as a PVC secondary plasticizer without having to exercise undue experimentation.

Relative to the amount of PVC within the composition, the chlorinated ester is present in any of the following amounts or ranges:

1. 1-50%;
2. 2-40%;
3. 1-30%;
4. 5-30%;
5. 10-25%; or
6. 10-20%.

The above percentages are relative percentages directed to describing the amount of chlorinated ester relative to the amount of PVC within the composition. The percentages are calculated as follows:

[(weight of the chlorinated ester within the composition)/(weight of PVC within the composition)]× 100%.

In another embodiment, the chlorinated ester may be present in the overall composition in an amount ranging from:

1. 1-50% by weight;
2. 5-35% by weight;
3. 5-20% by weight;
4. less than or equal to 20% by weight; or
5. 10-15% by weight.

This percent-by-weight amount in the overall composition is calculated as follows:

[(weight of chlorinated ester within the composition)/(weight of the overall composition)]× 100%.

In embodiments, the chlorinated ester is used in amounts of less than or equal to 25 parts per hundred resin.

Relative to the weight of the overall composition, the PVC is present in any of the following amounts or ranges:

1. 50-90% by weight;
2. 50-99% by weight; or
3. 65-95% by weight.

The above PVC percentages, directed to describing the amount of PVC in the composition, are calculated relative to the weight of the overall composition. More specifically, the amount of PVC within the composition is calculated as follows:

[(weight of PVC within the composition)/(weight of the overall composition)]×100%.

Embodiments are directed to using the chlorinated ester as a secondary plasticizer in a plurality of PVC applications, and for that reason, the chlorinated ester can be used as a PVC secondary plasticizer in any known manner for using PVC secondary plasticizers. Furthermore, the chlorinated ester can be used in any known method for manufacturing compositions that employ a PVC secondary plasticizer.

The chlorinated ester can be manufactured by persons of ordinary skill in the art using known methods. As a non-limiting example, the chlorinated ester can be manufactured by chlorinating a fatty-acid ester using any known chlorination process. As another non-limiting example, any chlorination process taught in U.S. Pat. No. 5,495,058 can be used, and the entire teachings of U.S. Pat. No. 5,495,058 are hereby incorporated by reference.

EXAMPLES

General Procedure for Chlorination of a Fatty Acid Methyl Ester

Fatty acid methyl ester is added to a three-neck flask equipped with a 0-150 C thermometer, a glass sparger or tube, an off gas line going to a flask containing caustic to neutral off gas HCl and a magnetic stir bar or a mechanical stirrer. Using a heating mantle the ester is warmed to about 50 C and then chlorine gas is slowly bubbled into the fatty acid methyl ester and HCl is scrubbed as off gas. The reaction is controlled by the rate of addition of chlorine or with cooling of the flask. The reaction is allowed to continue but maintaining a max temperature of about 90 C. When the chlorine addition is complete, to a predetermined % chlorine level, the chlorinated fatty acid methyl ester is then blown with dry air to remove all residual HCl. The product is then stabilized by the addition of 1-2% epoxy soy-bean oil.

Oil cuts derived from animal and vegetable sources used to make the esters are comprised of a variety of fatty acids with compositions varying in carbon number and degree of unsaturation, e.g., the number of double bonds. Of these various esters, it has been found that the chlorination products of these esters containing less than two double bonds act as suitable secondary plasticizers for PVC. These secondary plasticizers not only allow for the partial replacement of phthalates, a suspect chemical in regards to endocrine disruption, but also provide a safer, more biodegradable alternative compared to chlorinated paraffins.

Fatty acids commonly found in oil cuts having 2 or more double bonds are linoleic and linolenic acids ranging from 0-60% dependent upon the cut. During the chlorination of esters derived from these fatty acids and the nature of the double bonds allows for the formation of allylic chlorides as one double bond is chlorinated before the other. These allylic chlorides are unstable and potentially susceptible to dehydrochlorination inducing a free radical that leads to further decomposition of not only the chlorinated ester but potentially the PVC it has been used in as a secondary plasticizer. Chlorinated esters derived from fatty acids having less than two double bonds will not form allylic chlorides, chlorination occurring first across the single double bond via an addition reaction, eliminating all unsaturation prior to chlorination of saturated carbons via free radical halogenation.

To demonstrate this, esters derived from oil cuts of fatty acids and pure fatty acids representative of low (<2 double bonds) and high (≥2 double bonds) unsaturation were chlorinated in-house at Dover Chemical Corporation in Dover, Ohio, using general chlorination techniques. The ester cuts and esters of low unsaturation were as follows: a C16-18 methyl ester cut (C1618ME) comprised of 0.5% methyl laurate, 1% methyl myristate, 25-32% methyl palmitate, 65-75% methyl oleate and 1.5% methyl aracidate, a C12-14 methyl ester cut (C1214ME) comprised of 1% methyl decanoate, 70.5-74.5% methyl laurate, 24-29% methyl myristate, and 1% methyl palmitate, ester comprised of 99% methyl palmitate (C16ME), and an ester comprised of 99% methyl oleate (C18ME). The esters of low unsaturation were compared against an ester of high unsaturation comprised of 99% methyl linoleate (C18MEL). Analysis was performed on the chlorinated esters, after addition of epoxidized stabilizer, to determine percent chlorine, color (Gardner), and thermal stability as a measure of percent HCl evolution (JQD Test). The results are reported in Table 1.

TABLE 1

Chlorination results for methyl esters of low and high unsaturation.

| Ester Sample | % ES | % Cl | Color (Gardner) | JQD (% HCl, 175° C., 2 h) |
|---|---|---|---|---|
| C1618ME | 1.9 | 34.6 | 1.5 | 0.01 |
| C1214ME | 1.9 | 23.3 | <1 | 0.05 |
| C16ME | 1.9 | 33.7 | <1 | 0.08 |
| C18ME | 1.9 | 31.2 | <1 | 0.06 |
| C18MEL | 1.9 | 30.1 | 7 | 3.58 |

Based on considerations from Table 1, it can be readily seen that of the compositions presented, the ester of higher unsaturation, the methyl linoleate (C18MEL), when chlorinated displays higher color, 7G, as defined by Gardner Color Index (ASTM 01544 and D6166) as well as a higher JQD, 3.58%, which measures the % HCl generated over a period of 4 hours at 175° C. under a nitrogen purge and defines the materials heat stability. As discussed previously, this data confirms our notion that materials of high unsaturation during the chlorination process can form unstable allylic chlorides that are susceptible to dehydrohalogenation leading to the formation of radicals and the further degradation of the material. Thus, the use of such a chlorinated ester, or others similar in nature that are derived from unsaturated fatty acids containing 2 or more double bonds, would be undesirable imparting higher initial color to PVC and potentially compromising its integrity.[1] All remaining chlorinated esters, having less than 2 double bonds, exhibited little to no color with a Gardner rating of 1.5 or less and JQD values less than 0.1%.

To confirm our suspicions that stabilized chlorinated esters derived from those of high unsaturation would negatively impact initial PVC color, the stabilized chlorinated esters of this invention were employed as secondary plasticizers for polyvinyl chloride resins blending by any conventional method such as by mixing on a rolling mill which is heated to a temperature of about 180 degrees centigrade. After the formation of a band of film it was worked on the mill for a period of three minutes. The stabilized chlorinated esters were used as a secondary plasticizer to reduce the amount of primary plasticizer, specifically diisononyl phthalate (DINP). Materials used in the formulations in addition to the chlorinated esters and DINP included Oxy240 resin, zinc stearate (ZnSt), epoxidized soybean oil (ESO), and triisodecyl phosphite (TIP), all obtained from commercial sources with amounts listed in parts per hundred parts of resin (phr). Formulations A-F containing the various chlorinated esters are represented in Table 2.

TABLE 2

Polyvinyl chloride formulations with the stabilized chlorinated esters (phr).

| Material | A | B | C | D | E | F |
|---|---|---|---|---|---|---|
| Oxy240 | 100 | 100 | 100 | 100 | 100 | 100 |
| DINP | 55 | 40 | 40 | 40 | 40 | 40 |
| ESO | 3 | 3 | 3 | 3 | 3 | 3 |
| ZnSt | 0.25 | 0.25 | 0.25 | 0.25 | 0.25 | 0.25 |
| TIP | 3 | 3 | 3 | 3 | 3 | 3 |
| C1618ME | | 15 | | | | |
| C1214ME | | | 15 | | | |
| C16ME | | | | 15 | | |
| C18ME | | | | | 15 | |
| C18MEL | | | | | | 15 |

The following test procedures were employed once all formulations were processed on a roll mill to accumulate the data given in the following table. Once process the PVC was taken and used for color evaluation using a HunterLab D25 A optical sensor to measure yellowness index (YI) was performed on 7.5×7.5 mm plaques of the milled formulations, pressed using a Genesis Press (Wabash) at 180 centigrade and 3 psig for 30 seconds, followed by 25 psig for 3.5 minutes followed by cooling under 25 psig for 8 minutes. The pressed plaques are represented in FIG. 1.

Figure 2:
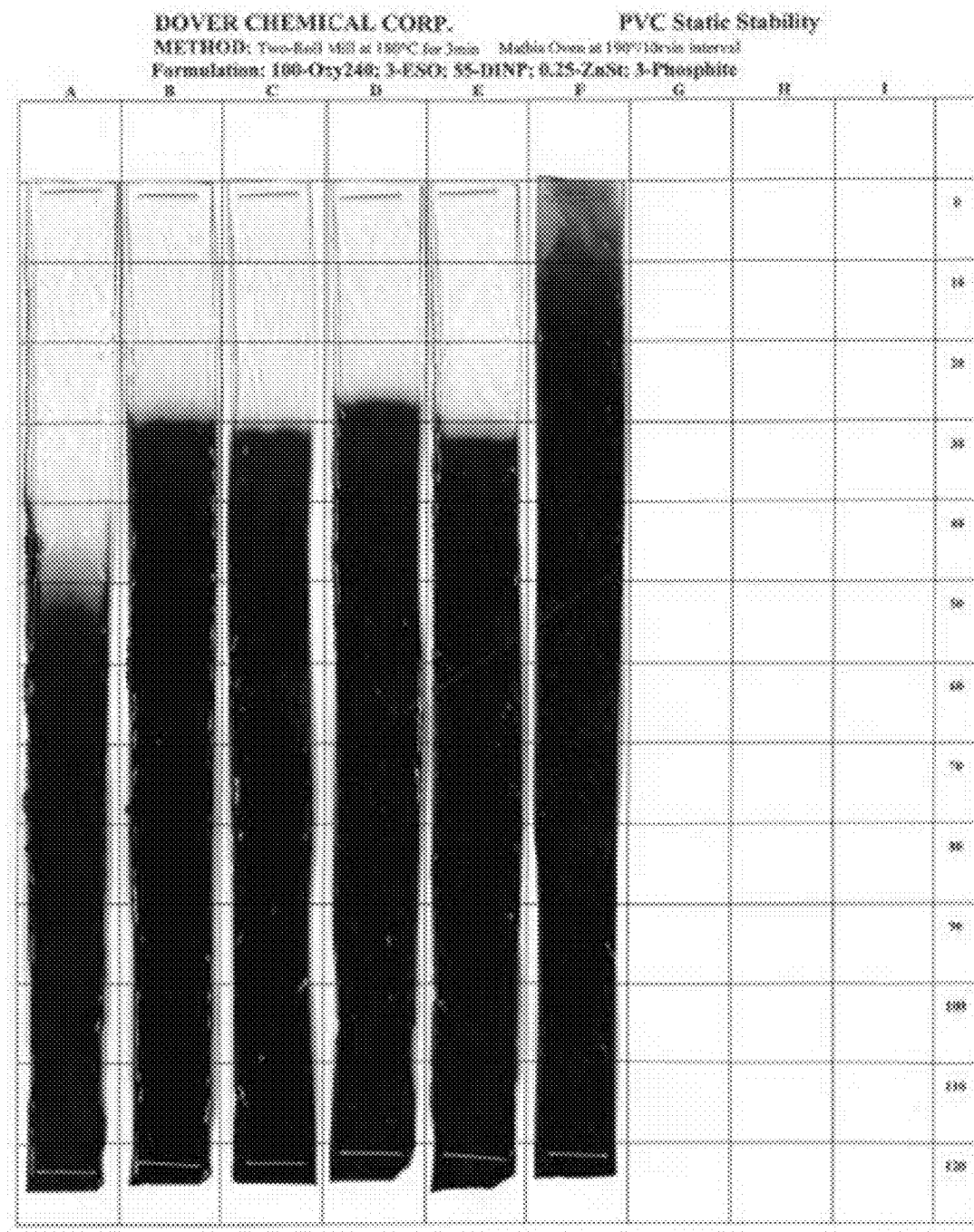
FIG. 2 shows Mathis Thermotester Oven results for formulations A-F in Table 2.

As seen in FIG. 1, plaques from chlorinated esters derived from esters of low unsaturation (B-E) exhibit little to no color and absolute clarity matching that of the control plaque (A). This is opposite the case when it comes to the formulation (F) using chlorinated methyl linoleate, which represents ester of high unsaturation having 2 or more double bonds. This plaque was so dark in color and lacking clarity that light could not pass through the plaque while scanning them as was the case when attempting to take optical measurements to determine yellowness index (YI). Apart from pressing plaques and taking initial YI readings, the process PVC was also subjected to short term heat stability testing via the employment of a Mathis Thermotester Oven as shown in FIG. 2. Milled samples were cut into strips (1.8×25 cm) and tested at 180° C. for two hours using 17 mm integrals set at 10 minute increments. Performance in regards to char time, the time it takes to burn or char the PVC, was recorded with YI values for the PVC formulation in Table 3.

TABLE 3

Comparison of initial YI of the processed PVC and char times for Mathis Stability.

| Formulation | A | B | C | D | E | F |
|---|---|---|---|---|---|---|
| Yellowness Index (YI) | 6.8 | 8.43 | 6.2 | 8.8 | 7.34 | UR* |
| Char Time (min) | 48 | 30 | 31 | 27 | 33 | 5 |

*UR = unreadable

The formulations, represented in FIG. 1 and Table 3, correspond to the stabilized chlorinated esters used. Based on the data presented, in general, phthalate levels can be reduced specifically using stabilized chlorinated esters derived from fatty acid esters of low unsaturation having less than two double bonds with little to no effect on initial color of the PVC with minimal compromise to char times. However, there was a remarkable difference in initial color in regards to yellowness index for chlorinated ester derived from fatty acid ester of high unsaturation having two or more double bonds as well as char time. When used as a secondary plasticizer the color and clarity of the PVC was severely compromised to the point that the plaque was so dark in color that light could not pass through the plaque to give a reading using the HunterLab D25 A optical sensor. As for char time the PVC began to degrade within approximately 5 minutes.

Figure 3:
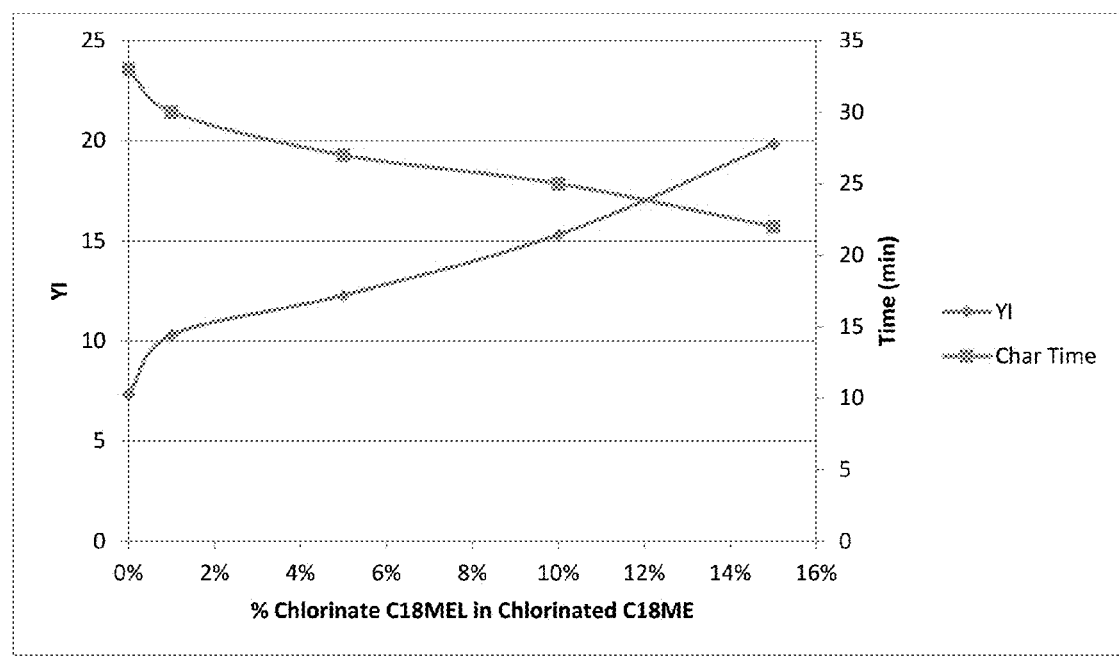
FIG. 3 shows char time and yellowness index versus % C18MEL in C18ME.

With the consideration that many fatty acid esters exist as oil cuts comprised of a variety of fatty acids with compositions varying in carbon number and degree of unsaturation, we wished to explore how the presence of a chlorinated ester derived from esters of high unsaturation existing at varying percent levels in chlorinated esters derived from esters of low unsaturation affect PVC when used as secondary plasticizers. Comparing blends of the chlorinated methyl linoleate in chlorinated methyl oleate at 1, 5, 10 and 15 percent, PVC was processed as previously described using 15 phr of each blend. Subsequent Mathis heat stability was performed as well as initial color assessments of the PVC. The results represented by Table 4 and FIG. 3 demonstrate that as the percent of chlorinated ester derived from esters of high unsaturation increases initial color increases and char time decreases.

TABLE 4

Chlorinated C18MEL blends with C18ME used as secondary plasticizer in PVC.

| Blend (% C18MEL in C18ME) | 0% | 1% | 5% | 10% | 15% |
|---|---|---|---|---|---|
| Yellowness Index (YI) | 7.34 | 10.3 | 12.29 | 15.31 | 19.83 |
| Char Time (min) | 33 | 30 | 27 | 25 | 22 |

Based on the data presented, it is clear that not all stabilized chlorinated esters are capable of being used as secondary plasticizers, specifically those of higher unsaturation having two or more double bonds imparting higher initial color and reduction of char times, which is a reflection of a reduction of heat stability, in PVC. Thus, stabilized chlorinated esters derived from esters of low unsaturation having less than two double bonds and blends thereof containing no species containing two or more double bonds can be used as secondary plasticizers to partially replace phthalate primary plasticizers with little to no compromise to the initial color and heat stability of PVC.

What is claimed is:

1. A composition comprising:
polyvinylchloride; and
a chlorinated ester having the chemical structure:

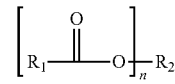

wherein $R_1$ is a $C_{6-22}$ chlorinated-hydrocarbon moiety,
wherein $R_2$ is a $C_1$-$C_{18}$ hydrocarbon moiety,
wherein n is 1, 2, 3, or 4,
wherein if n is greater than 1, each $R_1$ is the same or different; and
wherein the chlorinated ester is 15-70% by weight chlorine;
wherein the chlorinated ester is a product of a process that uses fatty-acid-ester reactants having less than two C=C double bonds;
wherein the chlorinated ester is a product of a process that does not use fatty-acid-ester reactants having two or more C=C double bonds; and
with chlorination occurring first across the single double bond via an addition reaction.

2. The composition claim 1, wherein n is 1.
3. The composition claim 1, wherein n is 2.
4. The composition claim 1, wherein n is 3.
5. The composition of claim 1, wherein n is 4.
6. The composition of claim 1, wherein the chlorinated ester is 15-60% by weight chlorine.
7. The composition of claim 1, wherein the chlorinated ester is 25-70% by weight chlorine.
8. The composition of claim 1, wherein the composition is 50-99% by weight polyvinylchloride.
9. The composition of claim 1, wherein the composition is 1-50% by weight chlorinated ester.
10. The composition of claim 1, wherein $R_2$ is $CH_3$.

11. The composition of claim 1, wherein the chlorinated ester does not have C═C double bonds.

12. The composition of claim 1, wherein the chlorinated ester is 25 to 55% by weight chlorine.

13. The composition of claim 1, wherein the chlorinated ester is 20 to 55% by weight chlorine.

14. The composition of claim 1, wherein the chlorinated ester is 25 to 50% by weight chlorine.

15. The composition of claim 1, wherein the chlorinated ester is 25 to 40% by weight chlorine.

16. The composition of claim 1, wherein:
the composition is 50-99% by weight polyvinylchloride;
the composition is 1-50% by weight the chlorinated ester;
$R_2$ is $CH_3$;
the chlorinated ester does not have C═C double bonds; and
the chlorinated ester is 25 to 40% by weight chlorine.

17. A composition comprising:
polyvinylchloride; and
a chlorinated ester having the chemical structure:

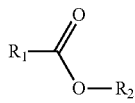

wherein $R_1$ is a $C_{12-18}$ chlorinated-hydrocarbon moiety;
wherein $R_2$ is a $CH_3$ hydrocarbon moiety;
wherein the chlorinated ester is greater than or equal to 15% by weight chlorine;
wherein the chlorinated ester is a product of a process that uses fatty-acid-ester reactants having less than two C═C double bonds;
wherein the chlorinated ester is a product of a process that does not use fatty-acid-ester reactants having two or more C═C double bonds;
with chlorination occurring first across the single double bond via an addition reaction; and
the composition is 1-50% by weight chlorinated ester.

18. The composition of claim 17, wherein the chlorinated ester is 15-40% by weight chlorine.

19. The composition of claim 17, wherein the chlorinated ester is greater than or equal to 25% by weight chlorine.

20. The composition of claim 17, wherein the composition is 10-15% by weight chlorinated ester.

21. The composition of claim 17, wherein the composition is 5-20% by weight chlorinated ester.

22. The composition of claim 17, wherein the composition is less than or equal to 20% by weight chlorinated ester.

23. The composition of claim 17, wherein the composition is 65-95% by weight polyvinylchloride.

24. The composition of claim 17, wherein the chlorinated ester does not have C═C double bonds.

25. The composition of claim 17, wherein the chlorinated ester is 25 to 55% by weight chlorine.

26. The composition of claim 17, wherein the chlorinated ester is 15 to 50% by weight chlorine.

27. The composition of claim 17, wherein the chlorinated ester is 25 to 50% by weight chlorine.

28. The composition of claim 17, wherein the chlorinated ester is 20 to 45% by weight chlorine.

29. The composition of claim 17, wherein the chlorinated ester is 25 to 40% by weight chlorine.

30. The composition of claim 17, wherein the chlorinated ester is 20 to 40% by weight chlorine.

31. The composition of claim 17, wherein:
the composition is 65-95% by weight polyvinylchloride;
the chlorinated ester does not have C═C double bonds; and
the chlorinated ester is 15-40% by weight chlorine.

32. The composition of claim 31, wherein the chlorinated ester is 20-40% by weight chlorine.

33. The composition of claim 31, wherein the chlorinated ester is 25-40% by weight chlorine.

34. The composition of claim 31, wherein the composition is a plastisol composition that is a suspension of PVC particles in a liquid phase comprising the chlorinated ester.

35. The composition of claim 1, wherein $R_1$ is a C10, C12, C14, C16, C18, or C20 chlorinated hydrocarbon moiety.

36. The composition of claim 17, wherein $R_1$ is a C10, C12, C14, C16, C18, or C20 chlorinated hydrocarbon moiety.

* * * * *